Figure 1:
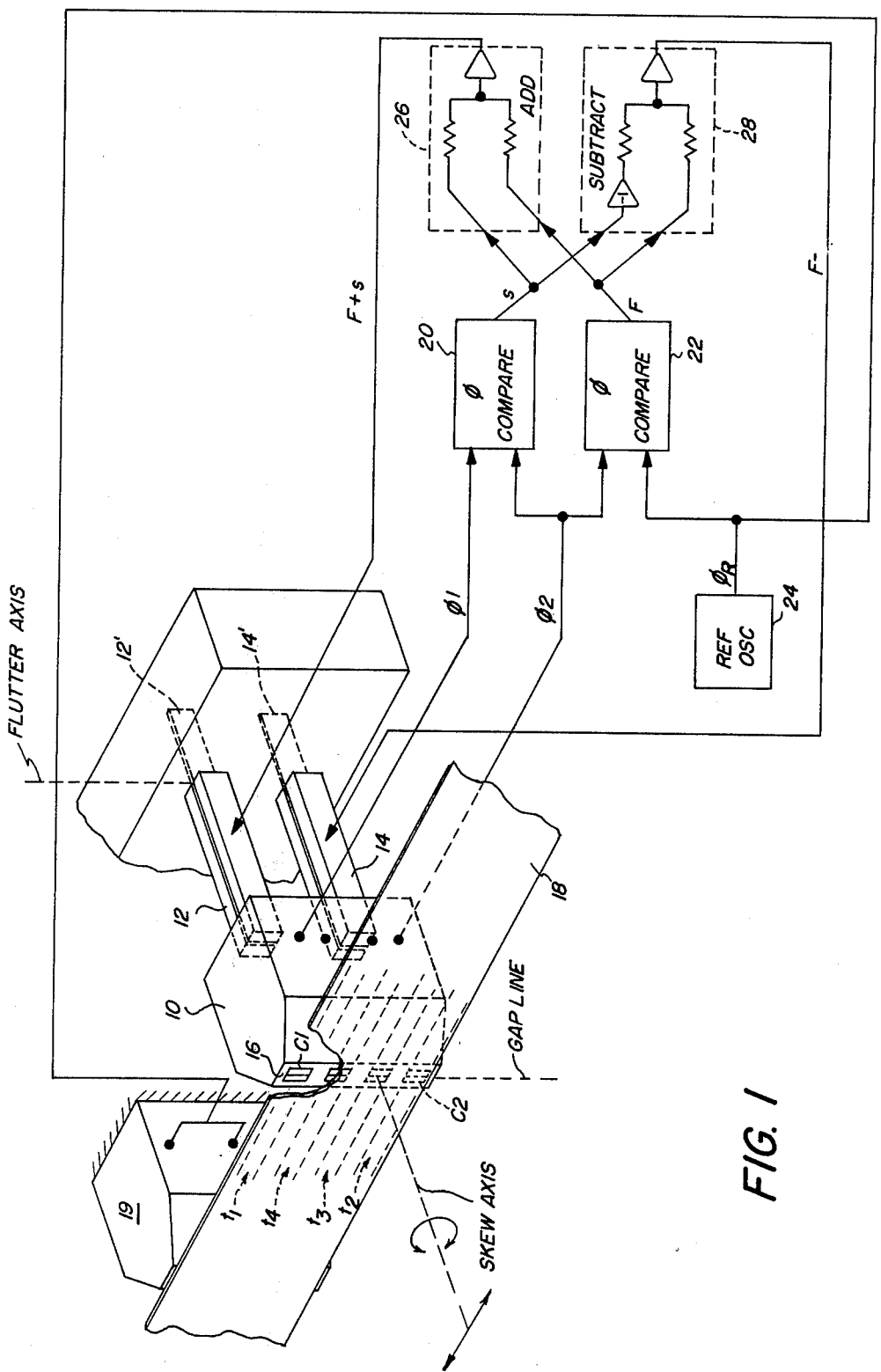
Figure 2A:
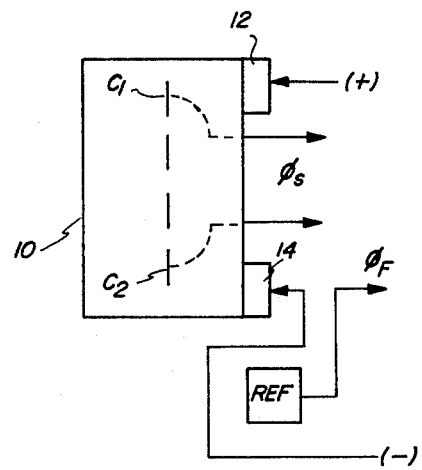
Figure 2B:
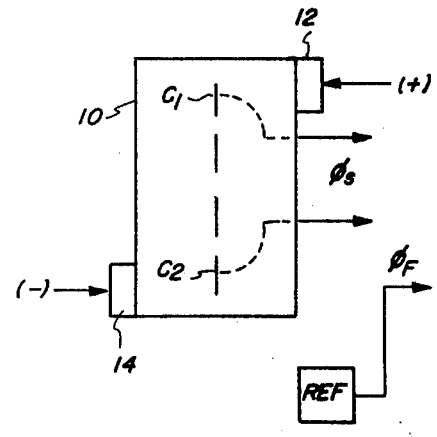
Figure 2C:
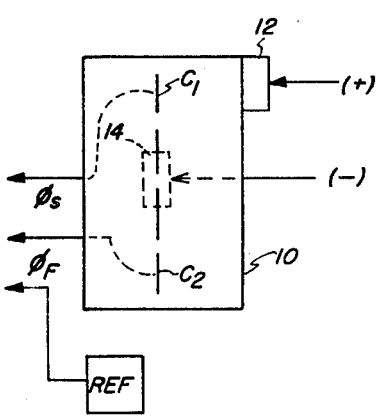
Figure 2D:
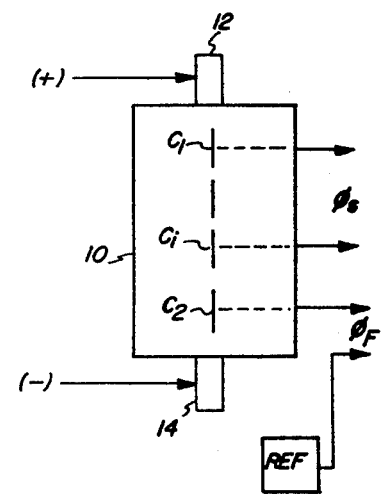

United States Patent [19]
Bixby et al.

[11] 4,258,398
[45] Mar. 24, 1981

[54] APPARATUS FOR PREVENTING FLUTTER AND SKEW IN ELECTRICAL SIGNALS

[75] Inventors: James A. Bixby, San Diego; Charles E. Wright, Escondido; Gilbert E. Kammerer, Del Mar, all of Calif.

[73] Assignee: Eastman Kodak Company, Rochester, N.Y.

[21] Appl. No.: 84,233

[22] Filed: Oct. 12, 1979

[51] Int. Cl.³ .................. G11B 5/43; G11B 21/02; G11B 21/24
[52] U.S. Cl. ................................ 360/76; 360/73; 360/109
[58] Field of Search ............... 360/76, 75, 104–105, 360/107, 109, 77

[56] References Cited
U.S. PATENT DOCUMENTS

| | | | |
|---|---|---|---|
| Re. 20,213 | 12/1936 | Sawyer | 179/100.4 |
| 2,656,419 | 10/1953 | Dingley, Jr. | 360/73 |
| 2,858,373 | 10/1958 | Hollmann | 179/100.4 |
| 2,937,239 | 5/1960 | Garber, Jr. et al. | 360/76 |
| 3,183,516 | 5/1965 | Sliter | 360/105 |
| 3,204,228 | 8/1965 | Eckert, Jr. | 360/76 |
| 3,526,726 | 9/1970 | Corbett et al. | 360/109 |
| 3,706,861 | 12/1972 | Giel | 360/75 |
| 3,787,616 | 1/1974 | Falk | 360/75 |
| 3,900,888 | 8/1975 | Uchikoshi et al. | 360/76 |

Primary Examiner—Alfred H. Eddleman
Attorney, Agent, or Firm—Robert F. Cody

[57] ABSTRACT

Flutter and skew prevention in the playback of recorded multitrack signals is provided by means of an articulated multitrack magnetic head. The head is positionable, with respect to the medium which is the source of the playback signals, by means of a pair of signal controllable actuators; and such actuators connect to the head at width-wise spaced-apart locations thereof. Operation of the actuators is by means of a pair of respective control signals: a sum signal and a difference signal. The sum signal represents the sum of a first phase error signal corresponding to the phase difference between signals produced by different cores of the multitrack head and a second phase error signal corresponding to the phase difference between a signal produced by a head core and a reference signal. The difference signal represents the difference between the first and second phase error signals, or similarly produced error signals.

10 Claims, 5 Drawing Figures

APPARATUS FOR PREVENTING FLUTTER AND SKEW IN ELECTRICAL SIGNALS

BACKGROUND OF THE INVENTION

1. Field of the Invention

This invention relates in general to multitrack recording apparatus and in particular to apparatus for preventing flutter and skew from occurring during the playback of recorded information signals.

2. Description Relative to the Prior Art

Flutter: In the recording of information signals on, say, a magnetic medium such as magnetic tape, it is usual to move the magnetic tape at a given speed during such recording, thereby to lay the information signals along the length of such tape. Then, during playback of the information signals recorded on the tape, the tape is moved relative to a playback head at the same given speed, thereby to provide faithful reproduction of the recorded information signals. Any cyclic change in the playback tape-to-head speed vis-a-vis the tape-to-head speed employed during recording manifests itself as flutter affecting the playback of the recorded signals.

Skew: When time-coherent information signals are recorded on a magnetic medium such as magnetic tape in several adjacent tracks thereof, it is necessary that the time coherence be preserved during signal playback, for otherwise relative distortion will occur among the various information signals. Typically, time-coherent information signals are recorded in adjacent tracks of a magnetic tape by means of a conventional multitrack magnetic head having a succession of aligned transducer gaps. The alignment of gaps constitutes a "gap line" and, during recording, the gap line has an azimuthal angle of, say, zero degrees with respect to the tape width. During playback, a multitrack head, with transducer gaps also arrayed along a gap line, coacts with the tape and, if the tape playback head gap line has the same (zero degrees) azimuthal angle as was employed during recording, distortion-less playback of the respective information signals results. As it turns out, however, two things can go awry and cause distorted playback: first, the azimuthal angle of the playback head gap line can be different from the record head gap line azimuthal angle, thereby giving rise to static skew; secondly, the tape during playback can cyclically yaw about an axis perpendicular to the plane of its recording surface, thereby giving rise to dynamic skew.

Admittedly, various signal processing techniques (generally involving delay lines and the like) have been disclosed which are directed to the elimination of flutter and static and dynamic skew from signals... after such conditions actually occur. In contrast with such techniques, there are also a number of known techniques which are directed to procedures for precluding flutter, and static and dynamic skew, from ever occurring in the first place. It is with respect to these latter techniques that the present invention is directed.

Falling into the category of those techniques for precluding the very existence of flutter and/or skew are the techniques disclosed in the following references:

U.S. Pat. No. 2,656,419, issued Oct. 20, 1953, teaches the recording of a signal of a frequency f along the length of a magnetic tape and, during playback, phase-comparing the recorded signal with a stable reference of frequency f, thereby to discern any doppler error in the recorded signal. A signal corresponding to the doppler error is then employed, in a dynamic mode to position the playback head to cancel, continuously, the error, and thereby preclude the existence of flutter.

U.S. Pat. No. 2,937,239, issued May 17, 1960, discloses a skew prevention technique in which reference signals are recorded in outbound tracks of a magnetic tape. The reference signals are played back, and phase-compared, to produce an error signal which is used to servo rotationally the playback head about an axis through the face of the head. Thus, any skew which starts to occur is immediately cancelled. (U.S. Pat. No. 3,204,228, issued Aug. 31, 1965, incidentally, employs reference signals recorded in outbound tracks much in the way of U.S. Pat. No. 2,937,239, but for purposes of producing respective signal processing delays for cooperation with skewed tracks between the outbound tracks.)

U.S. Pat. No. 3,526,726, issued Sept. 1, 1970, combines the goals of U.S. Pat. Nos. '419 and '239 in a magnetic head support employing four piezoelectric benders (also known in the art as "bimorphs"). Outbound tracks of a magnetic tape have reference signals recorded therein. The recorded reference signals during playback thereof are not compared with each other, but rather are compared with signals from a reference signal source. Such comparisons result, in the case of skew, in the production of oppositely-polarized signals which are applied to respective pairs of benders. One signal causes a pair of benders to skew the playback head one way; the other signal causes the other pair of benders to skew the head the other way. Absent the reference signal source, the apparatus of U.S. Pat. '726 will not, and indeed cannot, work to preclude skew. In the case of flutter, the signal comparisons which were indicated above produce similarly polarized signals which are applied to the respective pairs of benders. Since the signals are similarly polarized, the benders similarly translate the playback head to preclude flutter.

U.S. Pat. No. 3,787,616, issued Jan. 22, 1974, discloses the use of a single piezoelectric bender as a cantilever to which a magnetic playback head is attached. Sync signals derived from magnetic tape moving relative to the head are phase-compared with locally generated signals to produce error signals for flexing the bender to correct any time-base error caused by variation in the playback speed of the tape vis-a-vis the tape record speed.

Other art which has been examined and which serves as a backdrop for the present invention is as follows:

U.S. Pat. No. Re. 20,213, reissued Dec. 22, 1936
U.S. Pat. No. 2,858,373, issued Oct. 28, 1958
U.S. Pat. No. 3,183,516, issued May 11, 1965
U.S. Pat. No. 3,706,861, issued Dec. 19, 1972

SUMMARY OF THE INVENTION

Apparatus embodying the invention in its presently preferred form is adapted to preclude flutter and skew in the playback of recorded multitrack information signals by means of an articulated multitrack magnetic head. The head is positionable, with respect to the medium which is the source of playback signals, by means of a pair of signal controllable actuators; and such actuators connect to the head at widthwise spaced-apart locations thereof. Operation of the actuators is by means of a pair of respective control signals: a sum signal and a difference signal. The sum signal represents the sum of a first phase error signal corresponding to the phase difference between signals produced by different cores of the multitrack head and a second phase error signal corresponding to the phase difference between a signal produced by a head core and a reference signal. (As used herein, the term "core" shall be taken to mean a discrete transducer—gapless or otherwise—forming part of a multitrack head and adapted to cooperate with a single track of a recording medium.) The difference signal represents the difference between the first and second phase error signals, or similarly produced error signals.

In the event of, say, a skew condition which is just starting to occur (absent a flutter condition), sum and difference signals of opposite polarities start to get produced and cause the actuators to skew the head compensatorily. In the event, however, of a flutter condition which is just starting to occur (absent a skew condition), sum and difference signals of the same polarity start to get produced, and cause the actuators to translate the head compensatorily relative to the signal-producing medium. (A combination of a starting flutter condition and a starting skew condition is compensated for by appropriate algebraic values for the two error signals which comprise the sum and difference signals applied to the actuators.)

As presently preferred, the multitrack magnetic head is of the conventional, gapped, type; and the actuators are piezoelectric benders which serve as cantilevers for the head. The first phase-error signal corresponds to the phase difference between reference signals produced by the two outbound cores of the multitrack head; and the second phase-error signal corresponds to the phase difference between the signal produced by one outbound core and a locally-produced reference signal. The benders are disposed in a plane that intersects the face of the head at its gap line; and the sum and difference signals, when applied respectively to the benders, cause them to flex accordingly to preclude flutter and skew.

The invention will be described further with reference to the Figures, wherein:

FIG. 1 is a schematic block diagram, partially in perspective, showing a preferred embodiment of the invention; and FIGS. 2A-2D show several schematic variations of apparatus embodying the invention.

Referring to FIG. 1, a conventional (four-core) multitrack magnetic playback head 10 is supported by a pair of elongated piezoelectric benders 12, 14. In this embodiment of the invention, the benders 12, 14 serve as cantilevers for the head 10, the long axes of the benders being in a common plane that intersects the face 16 of the head 10 at its gap line. As is known, signal voltages applied across the benders with reference to their respective ground leads 12', 14' cause the benders to flex. Depending on the respective polarities of such signal voltages, therefore, the head 10 will pivot about (either or both) its flutter and skew axes.

In accordance with the preferred practice of the invention, outbound tracks $t_1$, $t_2$ of magnetic tape 18 contain respective reference signals which are recorded (by a magnetic record head 19) during the time that information signals are recorded in inbound tracks $t_3$, $t_4$ of the tape 18, the phases $\phi_1$, $\phi_2$ of the reference signals in the tracks $t_1$, $t_2$ being identical (i.e., $\phi_1 = \phi_2$) at the time such reference signals are actually recorded. The outbound cores $c_1$, $c_2$ of the head 10 cooperate, respectively, with the tracks $t_1$, $t_2$ to reproduce the signals recorded therein, such signals being applied to a phase comparator 20 of a well-known type.

One of the signals produced by means of an outbound core (core $c_2$ in this case) is applied as one input to a second phase comparator 22, the other input to the comparator 22 being produced by a reference signal source 24. The phase ($\phi_R$) of the reference signal from the source 24 is the same as the phase ($\phi_2$) of the core $c_2$ signal in the absence of time base error, i.e., $\phi_R = \phi_2$.

In accordance with a major aspect of the invention, the respective phase-error output signals (s and F) from the phase comparators 20, 22 are both applied to sum and difference networks 26, 28: the error sum signal (F+s) being applied to the bender 12; and the error difference signal (F−s) being applied to the bender 14.

Operation: Assuming that there is no azimuthal error between the record and playback gap lines, the phases $\phi_1$, $\phi_2$ of the signals produced by the cores $c_1$, $c_2$ are identical; and, attendantly, the comparator 20 has no output error signal. Also, assuming that there is no phase difference between the recorded reference signal produced by the core $c_2$ and the signal produced by the source 24 (i.e., there is no time base error), the comparator 22, then, also has no output error signal. Thus, with no signal voltages applied to the sum and difference networks 26, 28, they also produce no output signal voltages and, attendantly, neither bender 12, 14 is cuaused to flex correctively.

If, however, there is a gap line azimuthal error of a certain sense (sans flutter), the comparator 20 produces a correspondingly polarized signal, say, one which is positive (+s). Attendantly, the network 26 produces a positively polarized signal (+s) to flex the bender 12 one way; and the network 28 produces a negatively polarized signal (−s) to flex the bender 14 the other way ... thereby skewing the head 10 correctively about its skew axis.

Assume now that, in the absence of any gap line azimuthal error, there is a flutter-produced time base error (of a certain instantaneous sense) between the recorded signal of phase $\phi_2$ and the reference signal of phase $\phi_R$. This causes the phase comparator 22 to produce a correspondingly polarized phase error signal, say, one which is instantaneously positive (+F). When applied to the sum and difference networks 26, 28, such positive phase error signal exits both networks positively. Thus, with a positive signal applied to both benders 12, 14 by the sum and difference networks 26, 28, the benders similarly flex together to correct the time base error.

Simultaneously occurring gap line azimuthal and time base errors are similarly corrected by appropriate flexing of the benders in proportion to the algebraic sum and difference of the phase error signals.

Reference should now be had to the following Truth Table which reflects the algebraic workings of apparatus according to the invention, and wherein E represents a polarized voltage (of an appropriate value) to be applied to the benders 12, 14:

TABLE

|  |  | F + s | F − s |
|---|---|---|---|
| skew | $\phi_1 = \phi_2 = \phi_R$ | 0+0=0 | 0−0=0 |
|  | $\phi_1 > \phi_2 = \phi_R$ | 0+E=E | 0−(+E)=−E |
|  | $\phi_1 < \phi_2 = \phi_R$ | 0+(−E)=−E | 0−(−E)=+E |
| flutter | $\phi_1 = \phi_2 > \phi_R$ | +E+0=+E | +E−0=+E |
|  | $\phi_1 = \phi_2 < \phi_R$ | −E+0=−E | −E−0=−E |

With the above Truth Table in mind, consideration should now be given to the various plan schematic showings of FIG. 2. In schematic showing A, the bending axes of the benders 12, 14 have been situated in a common plane, but which plane is not common to a plane including the gap line of the head 10; in schematic showing B the gap line, and the bending axes of the benders 12, 14, are all in different planes; in schematic showing C, one bending axis is in a plane including the gap line, and one bending axis is not; and in schematic showing D, the use, say, of one outbound core $c_1$ and one inbound core $c_i$ for skew correcting is indicated. Note should be made that, regardless of the schematic form of the invention, the Truth Table always holds true. Obviously, other schematic variations within the concept(s) of the invention are possible as well, the showings of FIG. 2 being presented to provide appropriate basis for an appreciation of the broad scope of the invention.

Accordingly, it will be appreciated that the invention has been described in detail with particular reference to a certain preferred embodiment thereof, but it will be understood that variations and modifications can be effected within the spirit and scope of the invention. For example, although piezoelectric benders are employed in the preferred practice of the invention, if preferred otherwise, solenoids or the like could be used for head positioning. Also, although conventional magnetic heads have respective transducer gaps arranged along a gap line, the invention is effective in preventing flutter and skew in the use of multitrack magnetoresistive heads, and multitrack Hall-effect heads, and similar such devices, including non-magnetic multitrack playback devices cooperative with the respective non-magnetic recording media.

What is claimed is:

1. Apparatus for reproducing time-coherent information signals recorded in respective tracks of a plurality of tracks of a recording medium, at least two tracks of the plurality having recorded therein time-coherent reference signals having the same nominal phase, comprising:
   (a) playback means having a linear array of signal transducers respectively cooperating with said tracks for producing signals recorded therein;
   (b) a reference signal source for producing a signal having said nominal phase;
   (c) means cooperative with said playback means for comparing the phases of the played-back recorded reference signals and for phase-comparing the signal output of the reference signal source with one of said played-back recorded reference signals, thereby to produce a pair of error signals;
   (d) means for algebraically summing said error signals and for algebraically differencing said error signals, thereby to produce first and second control signals;
   (e) first and second signal-responsive means coupled to said playback means for respectively translating that means in the direction of said tracks, said coupling being at spaced-apart locations of said playback means which are crosswise with respect to said tracks; and
   (f) means for applying said error signals respectively to said first and second signal-responsive means, whereby simultaneously occurring error signals of like and different polarity cause respectively flutter cancelling positioning of said playback means along said tracks and skew cancelling rotation of said playback means about an axis thereof.

2. The apparatus of claim 1 wherein said playback means is adapted to reproduce time-coherent reference signals which are recorded in outbound tracks of said plurality of tracks.

3. The apparatus of claim 1, adapted for cooperation with a recording medium which is a magnetic tape having a plurality of longitudinally extending recording tracks, and wherein said playback means is a multitrack magnetic head adapted to reproduce time-coherent reference signals which are recorded in outbound tracks of the plurality of tracks.

4. The apparatus of claim 1 wherein said first and second signal-responsive means are piezoelectric benders which serve as cantilevers for said playback means.

5. The apparatus of claim 3 wherein said first and second signal-responsive means are piezoelectric benders which serve as cantilevers for said magnetic head.

6. The apparatus of claim 5 wherein said magnetic head has a plurality of cores having respective transducer gaps disposed along a gap line, and wherein the long axes of said benders, when unflexed, are in a common plane that substantially spatially coincides with said gap line.

7. Apparatus for magnetically recording and reproducing time-coherent information signals in and from respective tracks of a recording medium comprising:
   (a) a multitrack magnetic record head having a plurality of cores having respective transducer gaps disposed along a gap line;
   (b) means for producing and applying reference signals having the same nominal phase to at least two cores of said record head for magnetically recording information signals;
   (c) a multitrack magnetic reproduce head having a plurality of cores having respective transducer gaps disposed along a gap line, two of the cores thereof being adapted to reproduce the recorded reference signals;
   (d) first and second signal controllable means, coupled to said reproduce head at spaced cross-track locations thereof, for respectively supporting said reproduce head for movement thereof in the direction of the tracks of said medium;
   (e) means adapted to receive the reproduced reference signals for phase-comparing said reproduced reference signals to produce a first error signal;
   (f) means adapted to receive one of said reproduce reference signals for producing a second error signal corresponding to the phase difference of that signal with respect to said nominal phase;
   (g) means adapted to receive said first and second error signals for producing first and second control signals corresponding to the algebraic sum and difference of said error signals; and
   (h) means for applying the first and second control signals respectively to said first and second signal-controllable means,
   whereby said reproduce head is positionable to prevent signal flutter when said first and second control signals are of like polarity, and positionable to prevent signal skew when said first and second control signals are of different polarity.

8. The apparatus of claim 7 wherein said means for producing and applying reference signals to two cores of said record head is adapted to apply such signals to those cores of the head which are outbound of the cores thereof which are adapted to record information signals.

9. The apparatus of claim 7 wherein said first and second means for supporting said reproduce head are respectively elongated piezoelectric benders that serve as cantilevers for said reproduce head.

10. The apparatus of claim 9 wherein the long axes of the unflexed benders and the gap line of said reproduce head are all adapted to lie in substantially the same plane.

* * * * *